US006948088B1

(12) United States Patent
Sharan

(10) Patent No.: US 6,948,088 B1
(45) Date of Patent: Sep. 20, 2005

(54) METHODS AND APPARATUS FOR EFFICIENT TRANSACTION PROCESSING ON REDUNDANT SYSTEMS

(75) Inventor: Ishita Sharan, Santa Clara, CA (US)

(73) Assignee: Cisco Technology, Inc., San Jose, CA (US)

(*) Notice: Subject to any disclaimer, the term of this patent is extended or adjusted under 35 U.S.C. 154(b) by 783 days.

(21) Appl. No.: 09/881,443

(22) Filed: Jun. 13, 2001

(51) Int. Cl.[7] .............................................. G06F 11/00
(52) U.S. Cl. ......................................................... 714/6
(58) Field of Search ................................ 707/200, 201, 707/204; 714/1, 2, 3, 4, 5, 6, 10, 11, 12, 13, 714/14, 15, 100; 709/200, 230; 725/236, 725/248, 114, 115, 116, 143, 144, 146; 711/147, 711/161, 162

(56) References Cited

U.S. PATENT DOCUMENTS 6,785,696 B2 * 8/2004 Mosher et al. ............. 707/204

OTHER PUBLICATIONS

Laat et al, "Generic AAA Architecture", RFC 2903, Aug. 2000, 19 pages.

Vollbrecht et al., "AAA Authorization Framework" RFC 2904, Aug. 2000, 25 pages.

J. Vollbrecht et al., "AAA Authorization Application Examples", Aug. 2000, 38 pages.

* cited by examiner

*Primary Examiner*—Robert B. Harrell
(74) *Attorney, Agent, or Firm*—Beyer Weaver & Thomas LLP

(57) ABSTRACT

Methods and apparatus are provided for performing efficient transaction processing. A working system processes transactions associated with nodes in a data network. The working system can store information such as, for example call state, accounting, subscriber, and/or session information. The working system identifies characteristics and/or relationship information corresponding to the various transactions to modify transaction information into condensed transaction information. The condensed transaction information can be provided to the redundant system coupled to the working system. Upon failover, the redundant system can use the condensed transaction information to maintain flows, such as, for example voice calls between network nodes.

53 Claims, 9 Drawing Sheets

METHODS AND APPARATUS FOR EFFICIENT TRANSACTION PROCESSING ON REDUNDANT SYSTEMS

BACKGROUND OF THE INVENTION

1. Field of the Invention

The present invention relates to redundant systems. More specifically, the present invention provides techniques for efficient transaction processing on a working system having a redundant system.

2. Background

To provide high availability at a working system such as a cable network headend in a data network, redundant systems at a network node are typically used. A working system is a system in a data network configured to perform normal operations, such as, for example, routing operations, while a redundant system is a system configured to assume the duties of the working system upon failure of the working system. High availability is particularly important in data networks handling real-time flows such as voice calls. Some prior art redundant systems fail to maintain services flows upon working system failure and consequently drop voice calls between clients. One of the reasons why the redundant system can not maintain service flows upon working system failure is that the redundant system typically is not configured to store layer three and layer four information such as session, accounting, subscriber, address, and/or call state information.

The redundant system typically does not have a data structure containing the pertinent transaction information for several reasons. Information associated with a message from a particular client is referred to herein as transaction information. A redundant system can often be a passive backup without access to the actual data flows. In one example, the redundant system does not have access to the line cards until after failover occurs. Even if the redundant system could periodically request the necessary transaction information from the working system, conventional working systems do not support layer three and layer four functionality and furthermore typically do not store all transactions.

For example, conventional redundancy systems are typically not configured to store state information. In one example, CMTS units coupled to a cable network are not configured to store layer 3 and layer 4 information associated with various service flows. CMTS units have not conventionally been configured to store layer 3 and layer 4 information because of a variety of concerns including cost and compatibility with existing standards.

Working systems typically handle a very high volume of transactions. A large volume of transaction information is difficult to store in various data structures such as log files, journals, and/or databases. It is also difficult to provide the transaction information to a redundant system in a timely and efficient manner. In particular, a working system can not process a large volume of transaction information and provide the transaction information to a redundant system in real-time while processing other transactions.

Because of the inability of a working system to maintain and provide transaction information to a redundant system, a redundant system does not have the necessary information, such as state tables, to maintain service flows between clients. In one example, existing voice calls are dropped upon failure of the working system. The redundant system conventionally needs to reestablish service flows between clients upon failure of the working system. The failure to maintain service flows limits the ability to provide high availability systems in data networks.

In light of the above, it will be appreciated that it is desirable to provide techniques for efficiently managing transaction information as well as techniques for effectively providing transaction information to a redundant system to enable improved failover capabilities.

SUMMARY OF THE INVENTION

Methods and apparatus are provided for performing efficient transaction processing. A working system processes transactions associated with nodes in a data network. The working system can store information such as, for example call state, accounting, subscriber, and/or session information. The working system identifies characteristics and/or relationship information corresponding to the various transactions to modify transaction information into condensed transaction information. The condensed transaction information can be provided to the redundant system coupled to the working system. Upon failover, the redundant system can use the condensed transaction information to maintain flows, such as voice calls between network nodes.

According to one embodiment of the invention, a method is provided for a working system to provide transaction information to a redundant system in a data network, where the working system coupled to a plurality of nodes. A first transaction at the working system is identified. A second transaction at the working system is identified. The first and second transactions are characterized using relationship information to generate condensed transaction information corresponding to the first and second transactions. The condensed transaction information is provided to the redundant system.

The relationship information may be a characteristic common to both the first and second transactions.

According to another embodiment, a method is provided for a working routing engine associated with a data network to process transaction information associated with a plurality of nodes. Transaction information associated with a plurality of transactions is identified. The transaction information is condensed using relationship information corresponding to the plurality of transactions to generate condensed transaction information. The condensed transaction information is provided to a redundant routing engine.

According to another embodiment, a cable network headend coupled to a plurality of nodes in a data network is provided. A working system has a processor coupled to memory and an interface. The first processor is configured to identify transaction information and condense the transaction information using relationship information. The interface is coupled to the processor for transmitting the condensed transaction information. A redundant system has a second processor coupled to second memory and a second interface. The second interface is provided for receiving the condensed transaction information.

According to other embodiments, a working system coupled to a redundant system and a plurality of nodes in a data network provided. The working system comprises memory and at least one processor. The at least one processor is configured to identify transaction information associated with a plurality of transaction and to characterize the transaction information using relationship information to generate condensed transaction information. An interface is coupled to the processor. The interface is configured to provide condensed transaction information to the redundant system.

Still other embodiments of the invention pertain to computer program products including a machine readable medium on which is stored program instructions, tables or lists, and/or data structures for implementing a method as described above. Any of the methods, tables, or data structures of this invention may be represented as program instructions that can be provided on such computer readable media.

A further understanding of the nature and advantages of the present invention may be realized by reference to the remaining portions of the specification and the drawings.

DETAILED DESCRIPTION OF THE PREFERRED EMBODIMENTS

Figure 1:
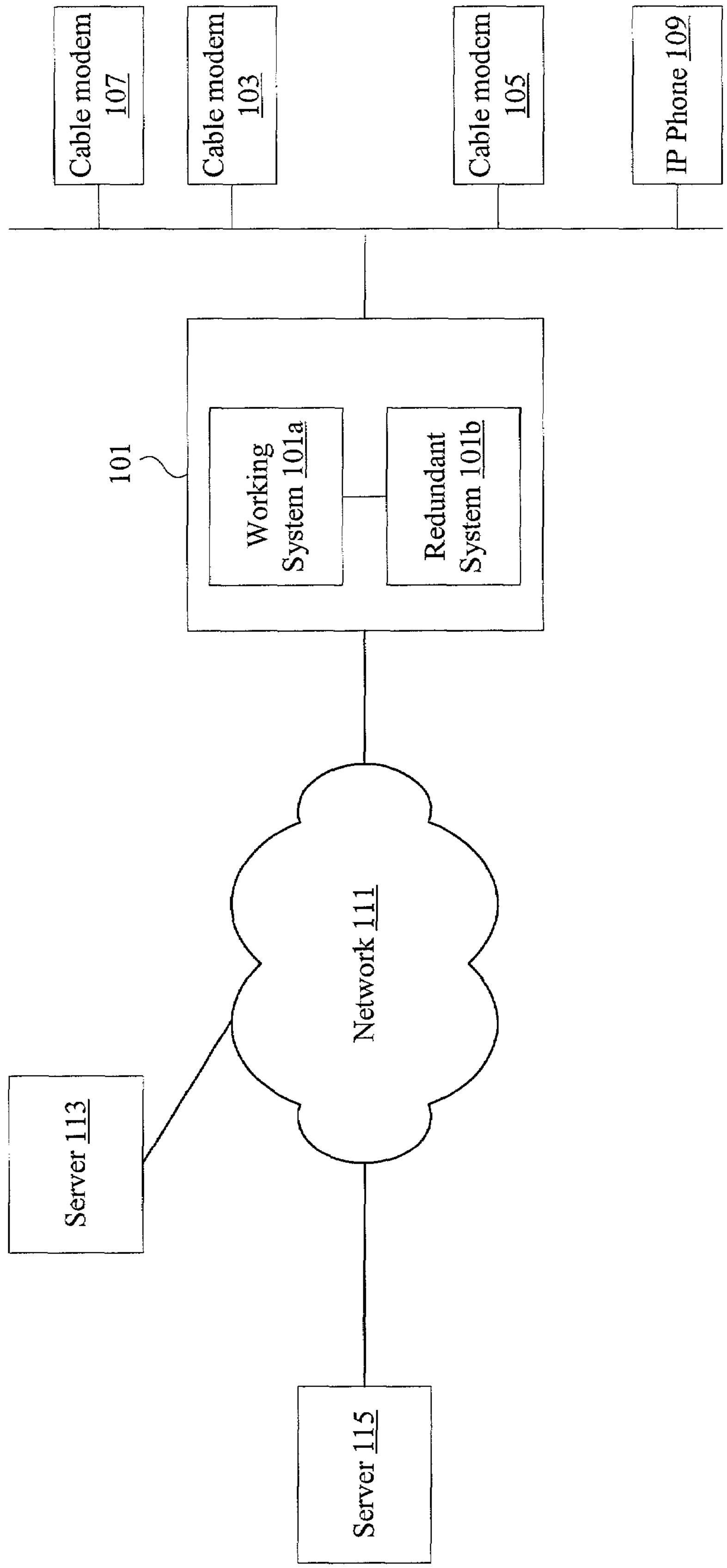
FIG. 1 is a diagrammatic representation of a system that can use the techniques of the present invention.

The present invention describes various techniques for providing a high availability system. In many applications, such as for example telephony and/or real-time video, high availability is an important characteristic. To provide high availability, redundant systems are provided for assuming the tasks of a working system upon failure of the working system. The working system may be responsible for routing messages from a source to a destination, tracking network usage by a particular client, and allocating bandwidth for particular data flows. To perform these tasks, the working system can maintain transaction information associated with particular users or flows. For example, the working system may be maintaining the particular length of a video session between two clients. The length of the video session may be used for billing purposes. In another example, the working system may be maintaining state tables for a series of voice calls. The state tables would be pertinent to maintaining the voice calls upon failover to the redundant system.

A redundant system uses the information maintained by the working system in order to seamlessly take over the tasks of the working system upon working system failure. The redundant systems can use the transaction information about the length of a particular video session between clients to continue to track the video session. Video and/or other data can continue to pass between the clients upon failure of the working system without disruption of service or loss of information including billing information. However, the amount of information maintained by the working system may be voluminous. According to various embodiments, transaction information is modified to allow the redundant system to receive a manageable amount of information. In one example, the transaction information is condensed to provide a manageable amount of information. Transaction information is modified dynamically by analyzing the underlying characteristics of received transactions on-the-fly. Some transactions may be combined into a single entry based upon particular characteristics such as the type of information, the particular user, and/or accounting information. According to one embodiment, video and/or audio flows from a particular client to different destinations can be combined into a single transaction for billing purposes.

By recognizing the underlying characteristics of the transaction information, a voluminous number of transaction entries can be dynamically modified into a manageable transaction information database. A system operator can specify the underlying characteristics and the relationship information used to modify the transaction information. A system operator can also input a configuration file containing the characteristics and relationship information.

Using the characteristics and the relationship information, a working system can dynamically modify stored transaction information. The modified transaction information database can be easily maintained and quickly provided to the redundant system in real-time during processing of transactions on the working system. According to various embodiments, modifying the transaction information database can include condensing, compacting, and/or pruning the transaction information. The compacted transaction information can also be stored on the database of the working system and can be used for transaction processing on the working system itself. It should be noted, the transaction processing includes any type of processing used to handle a wide variety of data flows. Transaction processing can include message processing, routing, billing, or memory allocation.

FIG. 1 is a diagrammatic representation of a system in which the techniques of the present invention can be used. Although FIG. 1 will be used to describe the present invention in the context of cable modems, it should be noted that the techniques of the present invention are general and can be applied in a variety of contexts. A high availability system 101 couples various devices including cable modems 103, 105, and 107 and IP phone 109 to a network 111. Through network 111, the various devices can access server 113 and server 115. High availability system 101 contains the working system 101*a* and a redundant system 101*b*. Working system 101*a* can continuously communicate with redundant system 101*b*. High availability system 101 may contain other components some of which may have backup components and some of which may be standalone components. The working system 101*a* provides functionality to allow various devices 103–109 to communicate with servers 113 and 115. The working system 101*a*, for example, may track the amount of bandwidth used by particular devices, the amount of time logged for an IP phone call, call states, and destination addresses of particular messages. Working system 101*a* may be providing the transaction information to redundant system 101*b* periodically, continuously, or at specified times. Working system 101*a* and redundant system 101*b* may be monitoring each other's status. In one embodiment, the redundant system 101*b* sends heartbeat messages to monitor the availability of the working system.

According to specific embodiments, working system 101*a* can maintain the transaction database in condensed form to provide redundant system 101*b* with a modified database. Working system 101*a* handles the data flows between various devices 103–109 and servers 113 and 115. If working system 101*a* crashes or fails, redundant system 101*b* takes over the handling of the data flows between various devices 103–109 and servers 113 and 115. Since working system 101*a* is configured to provide redundant system 101*b* with current transaction information, failover can occur quickly in a matter of seconds. Redundant system 101*b* processes messages and data flows from the various devices as if it were working system 101*a*. The various network devices would typically not be able to recognize that the failover had even occurred. A call from IP phone 109 would not be dropped and would continue as if the failover had not occurred. By contrast, prior art techniques did not enable a working system to provide a redundant system with current transaction information. In one example, upon failover, a call would be dropped and would have to be re-established.

Figure 2:
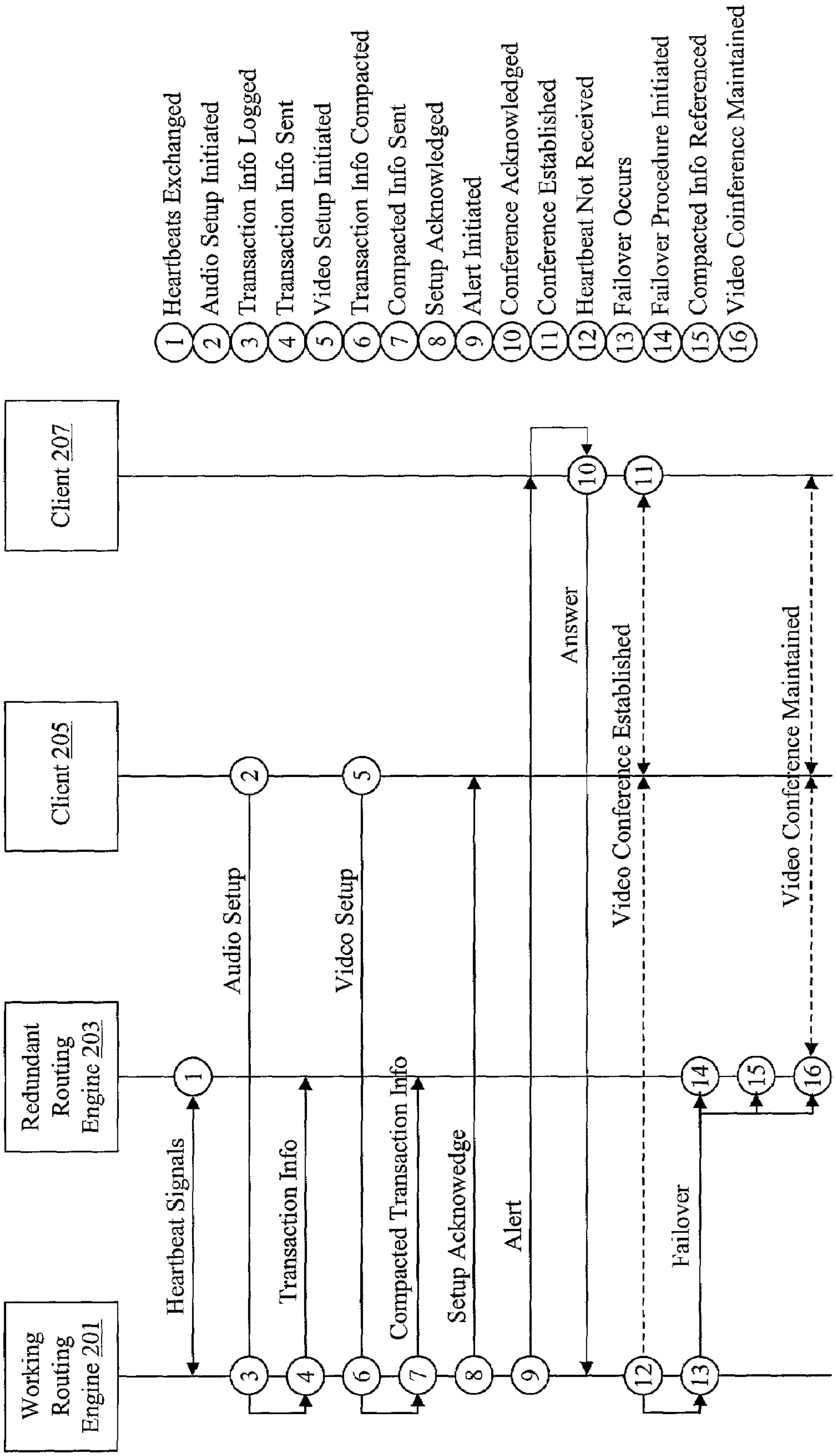
FIG. 2 is an interaction diagram showing the interaction between a working routing engine, a redundant routing engine, and clients.

FIG. 2 is an interaction diagram showing the interaction between routing engines and clients, according to specific embodiments. The working routing engine 201 and redundant routing engine 203 can be working system 101*a* and redundant system 101*b* of FIG. 1 respectively. Client 205 may be cable modem 103 of FIG. 1 and client 207 may be an entity connected to server 113. According to specific implementations, redundant routing engine 203 and working routing engine 201 transmit heartbeat signals at 1 to each other to check on the availability or status of the other system. As will be appreciated by one of skill in the art, a wide variety of protocols for coordinating redundancy are available. One technique for enabling redundancy is the Extended High System Availability protocol (EHSA), available from Cisco Systems, Inc of San Jose, Calif. EHSA can be used to coordinate redundancy between two processors or routers.

For purposes of illustration, it is assumed that client 205 corresponds to a cable modem which is attempting to initiate a teleconference video session with client 207 via a link which utilizes working routing engine 201. At 2, client 205 transmits an audio setup message to the working routing engine 201. The audio setup message may be the first transaction that the working running engine 201 receives. At 3, the working routing engine 201 stores the transaction information from the first audio setup message 211. According to various embodiments, working routing engine 201 immediately provides the transaction information at 4 to the redundant routing engine 203. According to other embodiments, the redundant routing engine 203 may request the transaction information at a different time. At 5, client 205 can also transmit a video setup message to the working routing engine 201. It should be noted that the audio setup message and video setup message are messages that may be forwarded to client 207. Working routing engine 201 receives the video setup message and stores the second transaction. Working routing engine 201 can analyze the characteristics of the audio setup message and the video setup message to determine whether the information can be placed in storage in compacted form.

According to specific embodiments, the characteristics or relationship information used to condense transaction information can be configured automatically. The working routing engine 201 at 6 may be configured to compact transaction information if the first and second transaction are from the same client and destined for the same user. The audio setup message and the video setup message can be part of the procedure for a client 205 to set up a video conference with client 207. Working routing engine 201 may recognize that the audio setup message corresponding to a first transaction and the video setup message corresponding to a second transaction can be written in compacted form.

Compacted transaction information is written to storage at 6. More detail about writing compacted transaction information to storage will be described below with reference to FIGS. 5 and 6. It should be noted that writing transaction information to storage can include writing transaction information to organized database tables, log files, and/or journals. The compacted transaction information is provided to the redundant routing engine 203 at 7. The compacted transaction information may overwrite information in the logs or databases of working routing engine 201 and redundant routing engine 203. A setup acknowledge message is transmitted from working routing engine 201 to client 205 at 8. An alert message is then transmitted at 9 from working routing engine 201 to client 207. If client 207 accepts or acknowledges the video conference, client 207 transmits an answer message back to working routing engine 201 at 10. According to various embodiments, the video conference is established at 11 between client 207 in client 205 through working routing engine 201.

As will be appreciated by one of skill in the art, a variety of different messaging sequences are possible for setting up a video conference. In one example, the audio setup messages and the video setup messages may actually be transmitted to the client 207. Different sequences of acknowledgment messages are also possible. Furthermore, although the present invention is described in FIG. 2 in the context of videoconferencing, the techniques of the present invention are applicable in a wide variety of contexts not limited to audio or video. For example, the techniques can be applied to data streams.

Assuming that working routing engines 201 fails, the redundant routing engine 203 may recognize that it did not receive a heartbeat signal from the working routing engine 201 at 12. The failover may initiate immediately at 13 or the redundant routing engine 203 may wait for the failure to receive several heartbeat signals before taking over operation from working routing engine 201. The failover may entail the redundant routing engine 203 taking over the handling of all audio and video flows between client 205 and client 207. Redundant routing engine 203 in the cable modem context will take over control of the line cards coupled to various cable modem networks as well as the interface associated with the external network such as the Internet at 14. The compacted transaction information received at 7 can be referenced at 15 to allow failover while maintaining the video conference. Since failover can occur quickly, in typically less than 10 seconds, the video conference is maintained at 16. Client 205 and client 207 typically do not recognize that the video conference is now being handled by redundant routing engine 203 instead of working routing engine 201. According to various embodiments, redundant routing engine 203 becomes the working routing engine. If and when the working routing engine 201 becomes available, the working routing engine 201 can become the redundant routing engine.

Figure 3:
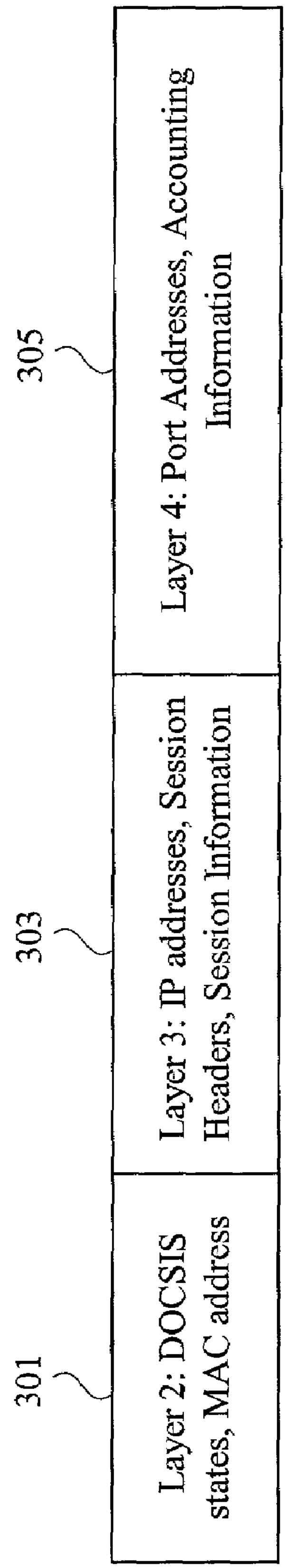
FIG. 3 is a diagrammatic representation of a packet transmitted to the routing engine of FIG. 2.

FIG. 3 is a diagrammatic representation showing a packet that can be sent to provide transaction information to a working routing engine 201 or a redundant routing engine 203. The packet may be transmitted as part of the message from client 205 to setup a video conference as shown in FIG. 2. It should be noted that a packet will typically contain information other than that not shown in FIG. 3 such as, for example length and quality of service information. The information shown in FIG. 3 may also be represented by multiple packets from a client to a working routing engine.

The information shown in FIG. 3 is transaction information that can be stored in working routing engine 201 and provided to redundant routing engine 203. Section 301 shows layer two information that the packet may contain. Layer two information includes DOCSIS states as well as MAC addresses. Section 303 shows layer three information including IP addresses, session headers, and/or session information that may be stored. Section 305 shows layer four information including port addresses and/or accounting information that may be stored. According to various embodiments, the working routing engine maintains layer three and layer four transaction information. Conventional cable network headends do not maintain layer three and layer four information. Maintaining layer three and layer four transaction information helps to allow efficient failover from a working routing engine to a redundant routing engine. According to specific embodiments, a routing engine 701 handles layer three and layer four operations while the lines cards 731 handle layer one and layer two operations.

Critical information is provided by the working routing engine to the redundant routing engine to allow for continuous flows even in the event of a working routing engine failure. For example, by maintaining the accounting information in the working routing engine and passing the accounting information to the redundant routing engine, the redundant routing engine can maintain the data flow such as a video conference upon failure of the working routing engine.

As will be appreciated by one of skill in the art, the redundant routing engine may lack other layer three and layer for information that allows maintenance of the video conference. For example, the redundant routing engine may not be configured to store information about what session a particular video or audio packet belonged to. Alternatively, the redundant routing engine can drop the video conference so that the users could reinitialize the video and audio flows. Dropping data flows and causing delays during failover are typically not consistent with the characteristics of a high availability system desired in many applications. By maintaining compacted transaction information, the techniques of the present invention allow rapid efficient failover to a redundant system.

Figure 4:
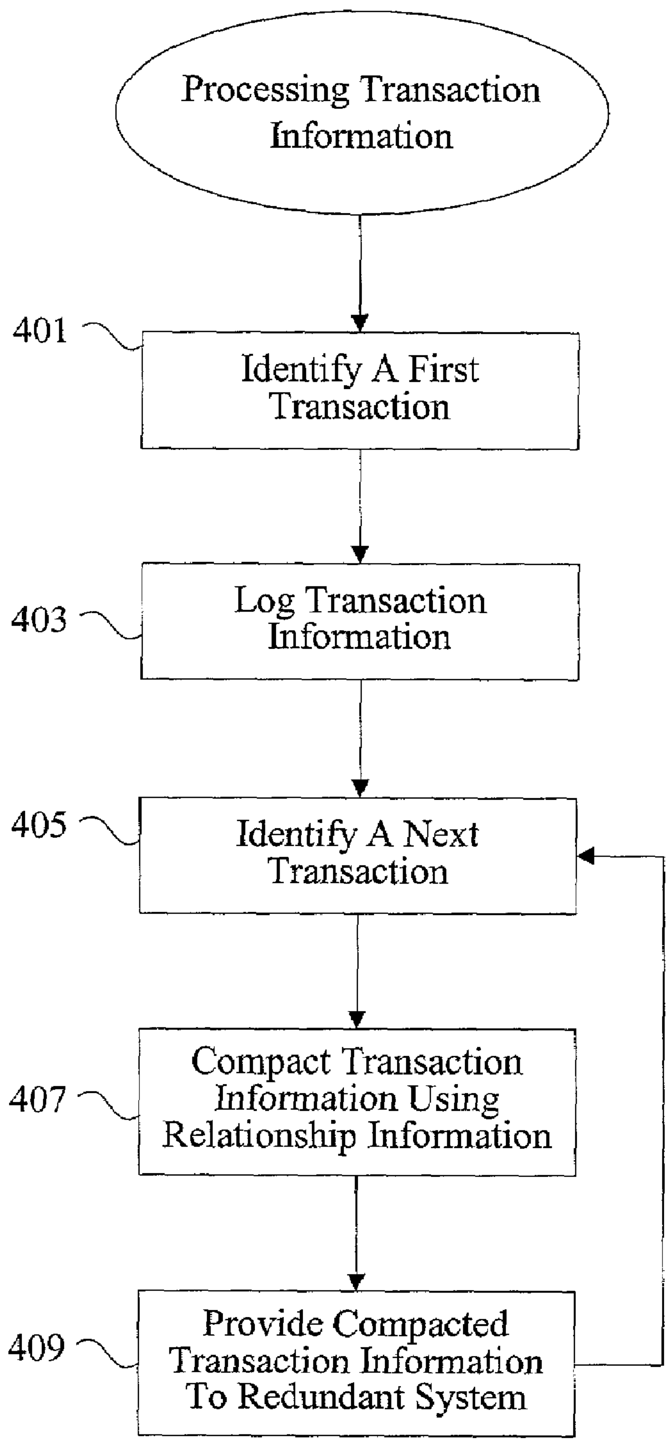
FIG. 4 is a process flow diagram showing the analysis of transaction information and the generation of compacted transaction information.

FIG. 4 is a process flow diagram showing the generation of compacted transaction information, according to various embodiments. At 401, the first transaction is identified. The first transaction may correspond to a message recently received. The transaction information is stored at 403. As noted above, storing transaction information can include logging and/or writing information into a database. At 405, a next transaction is identified. The next transaction may correspond to a message recently received. At 407, the transaction information is compacted using relationship information. Using relationship information can include analyzing the characteristics to various transactions. Characteristics associated with various transactions, for example identifiers, data types, time, addresses, etc. are referred to herein as relationship information. The use of relationship information will be described in greater detail below with reference to FIGS. 5 and 6. The compacted transaction information is then provided to the redundant system at 409. It should be noted that although the processes described in FIG. 4 as well as other figures are shown in a particular order, the techniques of the present invention do not require that the processes be performed in any particular sequence. For example, the transaction information can be provided to the redundant system at a variety of different times. In one example, the transaction information may be provided to the redundant system only upon request by the redundant system.

Figure 5A:
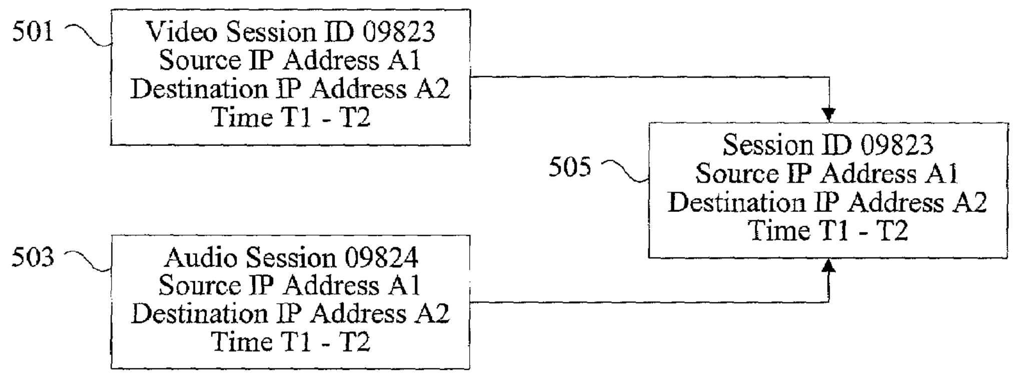
FIGS. 5A–5C are diagrammatic representations showing the compacting of transaction information.
Figure 5B:
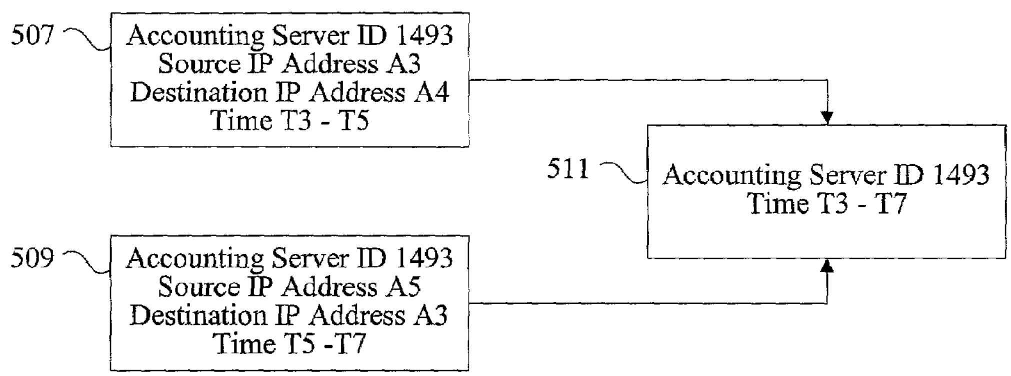
Figure 5C:
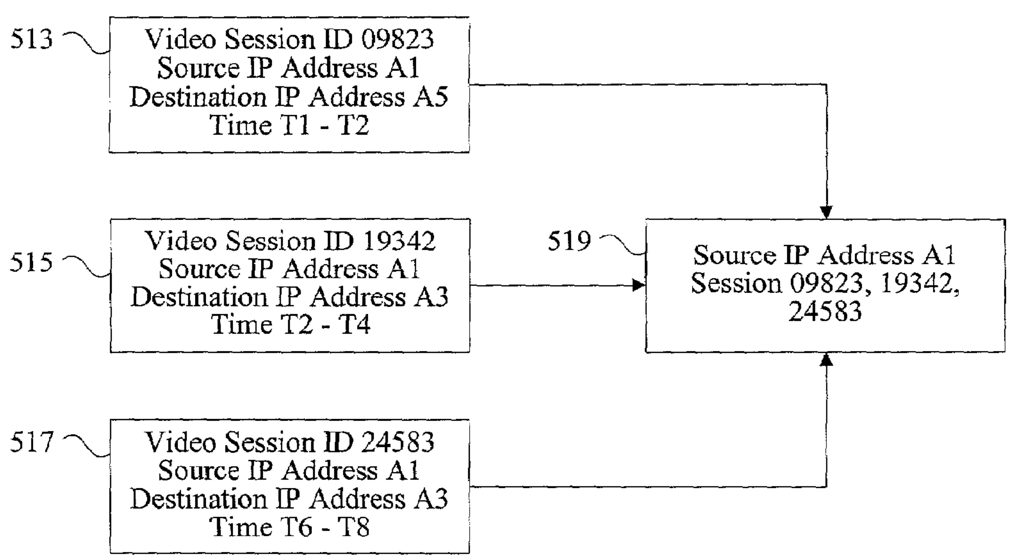
Figure 6:
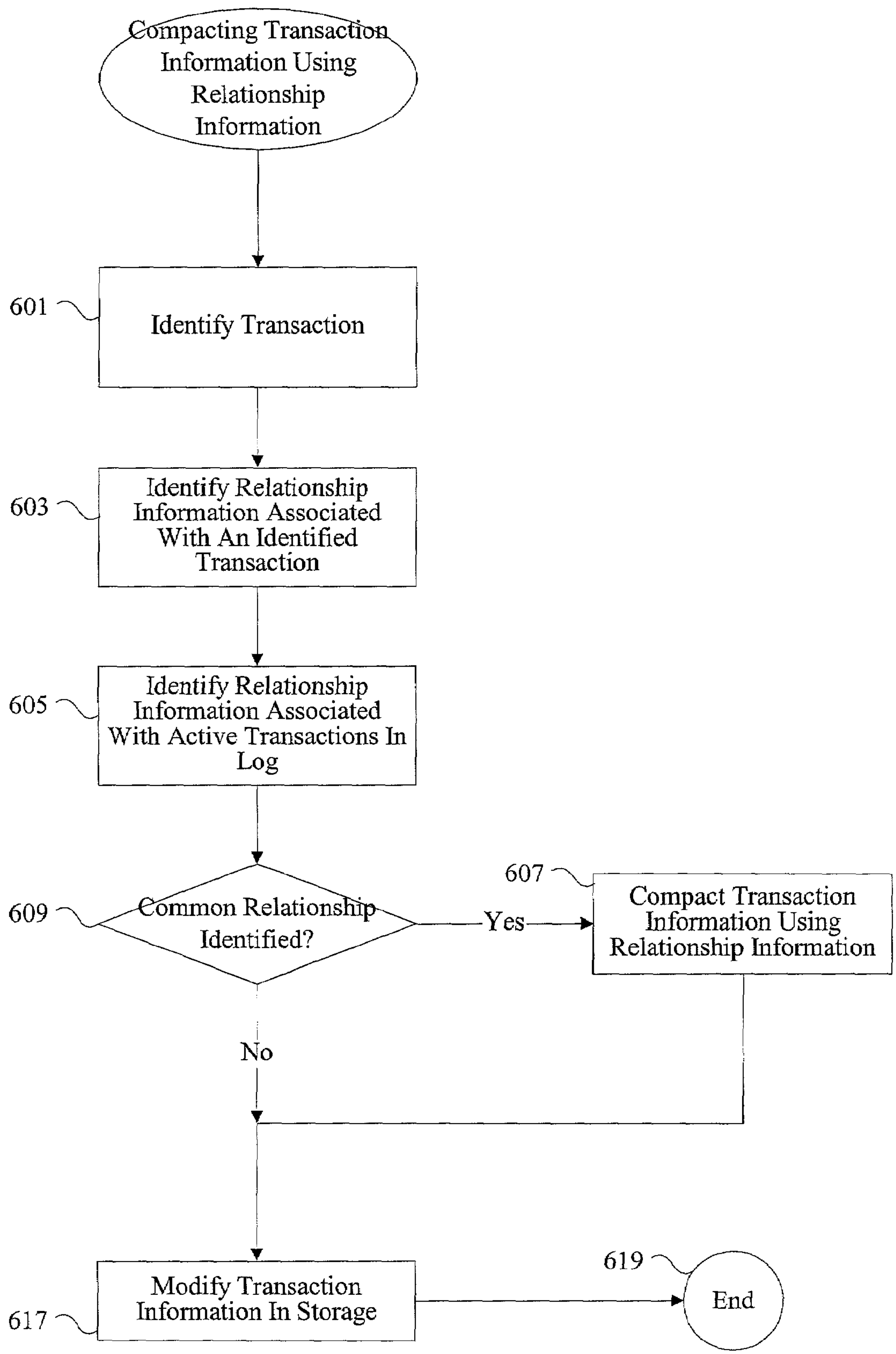
FIG. 6 is a process flow diagram showing techniques for compacting transaction information.

FIG. 5 is a diagrammatic representation showing the compacting of transaction information using relationship information. FIG. 6 is a process flow diagram showing techniques for compacting transaction information. For illustrative purposes, FIG. 5 will be described with reference to FIG. 6. At 601, the working system identifies a transaction. As noted above, the transaction may correspond to a recently received message, or it may be a transaction already in storage. At 603, relationship information associated with the transaction is identified. Relationship information allows the storage of the minimum number of transaction entries in a transaction information data structure or database. Relationship information can include session IDs, accounting server IDs, IP addresses, and client information. Relationship information associated with the active transactions and the logs are also identified at 605.

According to various embodiments, only active transactions are maintained in the log. According to other embodiments, active transactions as well as completed transactions are maintained. In one embodiment, a system administrator can use a command line interface and/or a configuration file to specify that relationship information includes accounting information, session information, and client information. Two transactions with common characteristics associated with three types of relationship information can be compacted into a single transaction entry.

At 609, it is determined whether relationship information allows the transactions to be compacted. For example, it can be determined whether the transactions contain common accounting information. Multiple users may all use the same account number on and accounting information server such as a radius server. Multiple users may purchase a block of time for use with IP telephony. All IP telephony calls using the account number are all billed to the same entity by the radius server. A first transaction entry 507 shows a transaction between source IP address A3 and destination IP address A4 between time T3 and T4. A second transaction entry 509 possibly corresponding to a message recently received shows a transaction between the source IP address A5 and a destination IP address A3 for time T5 to T7. Although the transactions are initiated by different source IP addresses, the accounting server ID 1493 used by both transactions. According to various embodiments, the same ID may mean that both data flows should be billed to the same account number. The other information about source and destination IP addresses does not necessarily have to be maintained in the database or log. If common accounting information exists as shown in entries 507 and 509, the transaction information contained in the entries is compacted into entry 511 at 607. Entry 511 shows that the transaction for billing to account server ID 1493 occur between time T3 and T7. It should be noted that the compacted transaction information typically includes fewer bytes than the original transaction entries. Accordingly, less bandwidth is needed to transmit the compacted transaction information to the redundant routing engine. Similarly, storing and processing compacted transaction information may be less resource intensive.

If no common accounting information exists, it can be determined at 609 whether common session information exists. According to various embodiments, after transaction information is compacted using accounting relationship information, the transaction information is compacted no further. According to other embodiments, the transaction information compacted by the accounting relationship is then analyzed to determine whether common session information exists. Entries 501 and 503 show common session information. Both entries show a transaction between source IP address A1 and destination IP address A2 between time T1 and T2. Entry 501 contains the video session ID 09823 and entry 503 contains the audio session ID 09824. Both entries can be compacted into a single entry for logging. Compacted entry 505 contains a session ID 09823 identifying a generic video and audio session. The session ID can be used for accounting, resource management, quality of service, and encryption. More detail on transaction information is provided in RFC 2903, RFC 2904, and RFC 2905, the entireties of which are incorporated by reference for all purposes.

The transaction information is compacted using the session relationship at 607. As noted above, after the transaction information is compacted using the session relationship, the transaction information may not be further compacted. According to other embodiments, it is determined at 609 whether common client information exists between the transactions. Entries 513, 515, and 517 shows video sessions with different video session IDs. The data flows occurred between various times between the same source IP address A1 at a variety of different destination IP addresses. According to various embodiments, the system administrator may decide that the information useful for storing and providing to a redundant routing engine is the source IP address and a list of session IDs. The system administrator may specify a variety of different types of relationship information.

The working system can use the configuration to automatically condense transactional information. Some types of relationship information may be used for allowing fast failover. Other types of relationship information may be specified for convenience, accounting, or ease of data analysis. It should be noted that entries 513, 515, and 517 show one example of compacting multiple entries into a single entry. The entries are compacted at 607 into entry 519 showing a source IP address of A1 and session IDs of 09823, 19342, and 24583. A system administrator may specify that multiple entries should be compacted into a single entry only after a certain number of entries having common relationship information exists in the database. This allows more information to be maintained in the database until there are too many entries with common relationship information.

After the transaction information is compacted using client relationship information, the transaction information is modified in storage at 617. Modification of storage can entail overwriting older entries in a database, log file, and/or a journal.

Generally, the transaction information processing technique of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention may be implemented in software such as an operating system or in an application running on an operating system.

A software or software/hardware hybrid system of this invention is preferably implemented on a general-purpose programmable machine selectively activated or reconfigured by a computer program stored in memory. Such a programmable machine may be a network device designed to handle network traffic. Such network devices typically have multiple network interfaces. One important class of device that may be used to implement the present invention is the Cable Modem Termination System. Preferably, the CMTS is a "routing" CMTS, which handles at least some routing functions. Alternatively, the CMTS may be a "bridging" CMTS, which handles only lower-level tasks.

Figure 7:
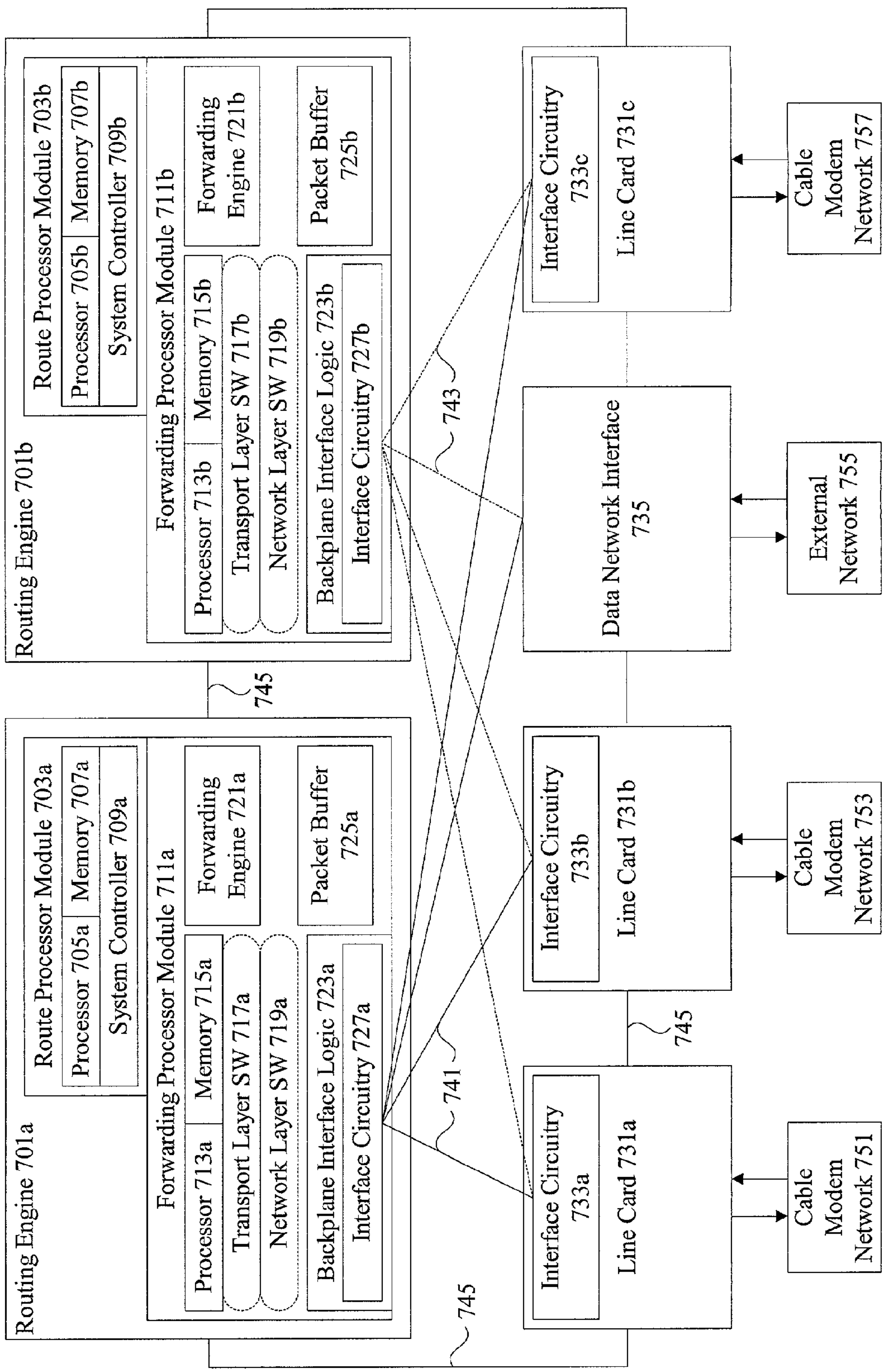
FIG. 7 is a diagrammatic representation of a system that can be used to implement the present invention.

FIG. 7 shows a block diagram of a specific embodiment of a Cable Modem Termination System (CMTS) 700 which may be used to implement certain aspects of the present invention. As shown in FIG. 7, the CMTS 700 may comprise a plurality of routing engines (e.g. 701*a*, 701*b*). In a specific implementation, Routing Engine A 701*a* may be configured as a primary or working routing engine, while Routing Engine B 701*b* may be configured as a backup or standby routing engine which provides redundancy functionality.

As shown in the embodiment of FIG. 7, each of the routing engines may include a variety of similar modules and/or components. In order to avoid confusion, the various components and/or modules relating to Routing Engine A 701*a* will now be described in greater detail with the understanding that such descriptions may also be applied to the corresponding components and modules of Routing Engine B 701*b*.

According to a specific embodiment, Routing Engine A may be configured or designed to include a plurality of functionally different modules or components, including, for example, a Forwarding Processor (FP) Module 711*a* adapted to provide packet forwarding functionality; a Route Processor (RP) Module 703*a* adapted to implement routing or forwarding operations; a utility component 702*a* adapted to provide system clock and timestamp functionality; etc. The routing engine components provide may be configured to provide layer one, layer two, layer three and layer four functionality as well as quality of service (QoS) functionality.

According to a specific implementation, the RP Module 703*a* may be configured as a processor-based routing system comprising functionality incorporated within a typical router, such as, for example, specially configured router models 1600, 2500, 2600, 3600, 4500, 4700, 7200, 7500, 10012, and 12000 available from Cisco Systems, Inc. of San Jose, Calif. For example, as shown in the embodiment of FIG. 7, the RP Module 703*a* comprises a general-purpose processor 705*a* (e.g., a MIPS route processor) coupled to a system controller 709*a* and memory 707*a*. It should be noted that components have been described in singular form for clarity. One skilled in the art would appreciate that multiple processors, a variety of memory formats, or multiple system controllers, for example, can be used in this context as well as in other contexts while falling within the scope of the present invention. The memory 707*a* may comprise synchronous dynamic random access memory (SDRAM) storage locations addressable by the processor 705*a* for storing software programs and data structures accessed by the components. A network routing operating system, portions of which may reside in memory and executed by the route processor, functionally organizes the router by invoking network operations in support of software processes executing on the router.

The RP processor 705*a* may be configured to construct and load routing tables used by the FP Module 711*a*. The processor 705*a* may also be configured or designed to perform configuration management functions of the routing engine 701*a*, and to communicate with neighboring peer, standby, and/or backup routers to exchange protocol data units used to construct the routing tables in accordance with conventional routing algorithms. It will be apparent to those skilled in the art that other memory types, including various computer readable media, may be used for storing and executing program instructions pertaining to the operation of the routing engine.

Interface circuitry 727*a* may be coupled to the respective interface circuitry 733*a*, 733*b* of line cards 731*a*, 731*b*. According to a specific implementation, interface circuitry 727*a* may be configured to reside on a backplane logic circuit 723*a* of the routing engine. In one example, the backplane logic circuit 723*a* is embodied as a high performance, application specific integrated circuit (ASIC). An example of a backplane logic circuit that may be advantageously used with the present invention is disclosed in co-pending and commonly owned U.S. patent application Ser. No. 09/791,063, filed on Feb. 22, 2001, the entirety of which is hereby incorporated by reference for all purposes.

According to a specific embodiment, the backplane logic circuit (which, according to a specific implementation, may be configured as an ASIC), may be configured to further interface the line cards to a packet buffer 725*a* and a forwarding engine 721*a* of the FP Module 711*a*. The packet buffer 725*a* may include memory which is configured to store packets as the forwarding engine 721*a* performs its packet forwarding functions. For example, the packet buffer may be used to store low priority data packets while high priority, low latency voice packets are forwarded by the forwarding engine to a data network interface 735*a*. According to various embodiments, the FP Module 711 may comprise a processor 713*a* and memory 715*a* for handling transport layer 717 and network layer 719 functionality. In one implementation, the processor 713*a* may be configured to track accounting, port, and billing information for various users on a cable modem network 751. The processor 713*a* may also be configured to maintain desired service flow or session state information in memory 715*a* such as, for example, for voice calls initiated over the cable modem network. The FP Module 711*a* may also be configured to provide transaction compacting functionality and/or data parcel tunneling functionality, etc.

According to a specific implementation, Routing Engine A 701*a* may be connected to Routing Engine B 701*b* via at least one link 746, such as, for example, a backplane line or system bus. Routing engine redundancy may be provided by designating one of the routing engines as the working or primary routing engine and designating the other routing engine(s) as the redundant or standby routing engine(s). When configured as a working routing engine, the Routing Engine A may perform all appropriate forwarding and routing functions. When a failure occurs at the working routing engine, the redundant routing engine (e.g. Routing Engine B) may then take over the operations of the working routing engine. Thereafter, when Routing Engine A recovers, it may assume the functions of the redundant routing engine, or it may take over the functions of the working routing engine.

According to different embodiments of the present invention, one or more of the routing engines may be configured to communicate with a plurality of line cards (e.g. 731, 735) via point-to-point links. For example, as shown in FIG. 7, each of the plurality of line cards 731 and 735 are connected to each of the routing engines 701*a*, 701*b* via point-to-point links 741 and 743. One advantage of the point-to-point link configuration is that it provides additional reliability in that the failure of one or more line cards will not interfere with communications between other line cards and the routing engine(s). For example, if Line Card A 731*a* suddenly failed, each of the routing engines would still be able to communicate with the other line cards.

According to a specific embodiment, the plurality of line cards may include different types of line cards which have been specifically configured to perform specific functions. For example, line cards 731 may correspond to radio-frequency (RF) line cards which have been configured or designed for use in a cable network. Additionally, line cards 735 may correspond to network interface cards which have been configured or designed to interface with different types of external networks (e.g. WANs, LANs,) utilizing different types of communication protocols (e.g. Ethernet, Frame Relay, ATM, TCP/IP, etc). For example, the data network interface 735*a* functions as an interface component between external data sources and the cable system. The external data sources transmit data to the data network interface 735*a* via, for example, optical fiber, microwave link, satellite link, or through various media. A data network interface may include hardware and software for interfacing to various networks. According to various embodiments, a data network interface may be implemented on a line card as part of a conventional router for a packet-switched network. Using this type of configuration, the CMTS is able to send and/or receive IP packets to and from the data network interface using, for example, network layer software 719*a*.

According to a specific implementation, the operations associated with obtaining an IP address for cable modems may be implemented by the network layer software. This may involve the CMTS communicating with a DHCP server (not shown) via a data network interface, for example.

As shown in FIG. 7, at least a portion of the line cards includes interface circuitry for providing an appropriate interface between the host line card, other line cards, and/or the routing engine(s). For example, interface circuitry 733*a* may include interconnect ports coupled to one or more of the point-to-point links 741, 743. According to a specific implementation, the interface circuitry functions as a translator that converts conventional formats of data received at the line cards to a suitable protocol format for transmission from the line card to the appropriate routing engine. In one implementation, the interface circuitry 733*a* may also include circuitry to perform cyclic redundancy code (CRC) generation and checking on packets, along with interconnect format checking.

According to a specific embodiment, the point-to-point links 741, 743 may be configured as clock forwarded links such that each point-to-point link comprises a at least one data wire for transporting data signals and at least one clock wire for carrying clock signals. However, it will be understood to those skilled in the art that the clock forwarding technique may be scaled to accommodate other clock forwarding arrangements such as, for example, connections comprising a plurality or data signals and/or clock signals. Additionally, according to a specific embodiment, each line card may be configured to provide at least one communication interface between the routing engines (701*a*, 701*b*) and a portion of the cable network. The data network interface 735*a* may couple the routing engine 701*a* to an external data network 755 such as, for example, the Internet.

According to one embodiment, all or selected lines cards, routing engines and/or data network interfaces may be configured to use at least one common dedicated line or backplane (e.g. 745). According to other embodiments, the routing engines 701*a*, 701*b* may have an additional dedicated connection(s) for supporting redundancy. In a specific implementation, the backplane may be configured as an Ethernet medium that is shared by the CMTS. When the line cards are inserted into the backplane, they communicate with the routing engines over the lines 745 in accordance with a "capabilities" exchange that identifies the types of line cards and their various characteristics/parameters.

According to a specific implementation, during initialization of the CMTS, the routing engines 701*a* and 701*b* negotiate for working routing engine status over the backplane. Assertion of working status causes the line cards 731 to configure their respective interface circuitry to communicate with the designated working routing engine (e.g. Routing Engine A 701*a*). The Routing Engine A 701*a* then configures the CMTS and line cards, establishes routing relationships, and initiates traffic forwarding operations. The redundant routing engine 701*b* may complete a self-test and perform initialization of its various functions. The two routing engine assemblies may then exchange conventional negotiation messages (which may include, for example, health and status messages) via the backplane lines 745. According to a specific implementation, the exchanged messages are defined by an Enhanced High System Availability (EHSA) negotiation algorithm available from Cisco Systems, Inc. of San Jose, Calif. The redundant routing engine may also request transaction information from the working routing engine.

When the redundant routing engine 701*b* detects that the primary routing engine has failed, the redundant routing engine may take over as the new working routing engine, and initiate a "cutover" operation to thereby cause the line card interface circuitry (e.g. 733*a*, 733*b*) to identify and communicate with the new working routing engine 701*b*. The new working routing engine 701*b* may then access and retrieve state information (such as, for example, telephone call state information, service flow state information, etc.) stored on selected line cards in order to maintain existing service flows.

Prior to a failure situation, the redundant routing engine 701*b* may be configured to monitor the status of the working routing engine 701*a*, and may further be configured or designed to receive updated configuration, transaction and/or state information, which may then be stored in an appropriate location in the redundant routing engine 701*b*.

The line cards may further comprise circuitry for "looping" packets back onto the redundant routing engine 701*b* over the point-to-point links. This allows the redundant routing engine 701*b* to send and receive test packets to evaluate its own operation in addition to the operation of the dedicated lines prior to the occurrence of a system failure.

The transaction information processing techniques of the present invention may be implemented on various general purpose Cable Modem Termination Systems. In a specific embodiment, the systems of this invention may be specially configured CMTSs such as, for example, specially configured models in the uBR-7200 and uBR-10012 series of CMTSs available from Cisco Systems, Inc. of San Jose, Calif. In an alternative embodiment, the methods of this invention may be implemented on a general-purpose network host machine such as a personal computer or workstation. Further, the invention may be at least partially implemented on a card (e.g., an interface card) for a network device or a general-purpose computing device.

Although the system shown in FIG. 7 represents one specific CMTS architecture of the present invention, it is by no means the only CMTS architecture on which the present invention can be implemented. For example, other types of interfaces and media could also be used with the CMTS.

Regardless of network device's configuration (for cable plants or otherwise), it may employ one or more memories or memory modules (e.g., memory 707*a*, 715*a*, etc.) configured to store program instructions for the network operations and other functions of the present invention described herein. The program instructions may specify an operating system and one or more applications, for example. Such memory or memories may also be configured to store data structures, log files, database tables, or other specific non-program information described herein.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Figure 8:
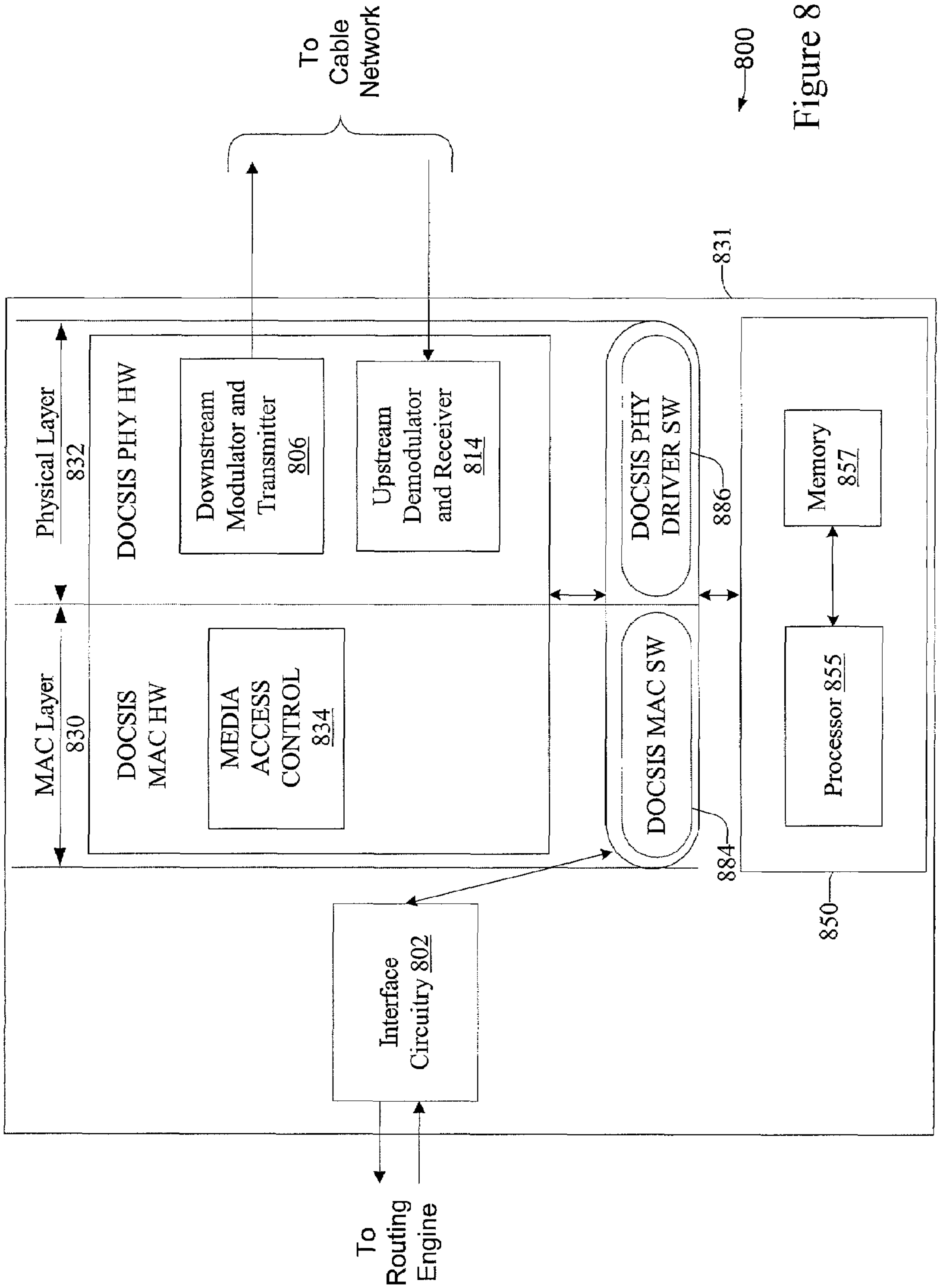
FIG. 8 is a diagrammatic representation of a line card associated with the system of FIG. 7.

FIG. 8 shows a specific embodiment of a line card 800 which may be used for implementing certain aspects of the present invention. According to a specific embodiment, the line card 800 may be configured or designed to implement selected aspects of the DOCSIS functionality which were conventionally implemented by the CMTS, such as, for example, DOCSIS MAC functionality.

In the specific embodiment as shown in FIG. 8, line card 800 provides functions on several network layers, including a physical layer 832, and a Media Access Control (MAC) layer 830. Generally, the physical layer is responsible for receiving and transmitting RF signals on the cable plant. Hardware portions of the physical layer include at least one downstream modulator and transmitter 806 and/or at least one upstream demodulator and receiver 814. The physical layer also includes software 886 for driving the hardware components of the physical layer.

Upstream optical data signals (packets) arriving via an optical fiber node are converted to electrical signals, and then demodulated by the demodulator/receiver 814. The demodulated information is then passed to MAC layer block 830. A primary purpose of MAC layer 830 is to encapsulate, with MAC headers, downstream packets and decapsulate, of MAC headers, upstream packets. In one embodiment, the encapsulation and decapsulation proceed as dictated by the above-mentioned DOCSIS standard for transmission of data or other information. The MAC headers include addresses to specific modems (if sent downstream), or to the CMTS (if sent upstream). Note that the cable modems also include MAC addressing components. In the cable modems, these components encapsulate upstream data with a header containing the MAC address of the CMTS.

MAC layer 830 includes a MAC hardware portion 834 and a MAC software portion 884. The MAC layer software portion may include software relating to DOCSIS MAC functionality. The MAC layer hardware and software portions operate together to provide the above-described DOCSIS MAC functionality. In a preferred embodiment, MAC controller 834 is dedicated to performing some MAC layer functions, and is distinct from processor 855.

After MAC layer block 830 has processed the upstream information, it is then passed to interface circuitry 802. As described previously, interface circuitry 802 includes the appropriate hardware and/or software for converting data formats received at the line cards to a suitable protocol format for transmission from the line card to an appropriate routing engine.

When a packet is received from the routing engine at the interface circuitry 802, the packet is then passed to MAC layer 830. The MAC layer 830 transmits information via a one-way communication medium to downstream modulator and transmitter 806. Downstream modulator and transmitter 806 takes the data (or other information) in a packet structure and converts it to modulated downstream frames, such as MPEG or ATM frames, on the downstream carrier using, for example, QAM64 modulation. Other methods of modulation may also be used such as, for example, QAM256 modulation, CDMA (Code Division Multiple Access), OFDM (Orthogonal Frequency Division Multiplexing), FSK (FREQ Shift Keying), etc. The return data is likewise modulated using, for example, QAM16 or QSPK. According to a specific embodiment, the modulated data is converted from IF electrical signals to RF electrical signals (or vice-versa) using one or more electrical signal converters (not shown).

As shown in FIG. 8, line card 800 includes a central hardware block 850 including one or more processors 855 and memory 857. These hardware components interact with software and other hardware portions of the various layers within the line card. They provide general purpose computing power for much of the software. Memory 857 may include, for example, I/O memory (e.g. buffers), program memory, shared memory, etc. One or more data structures used for implementing the technique of the present invention may reside in such memory. In one embodiment, the software entities 882, 884, and 886 are implemented as part of a network operating system running on hardware 850. Preferably, at least a part of the transaction information processing functionality of this invention are implemented in software as part of the operating system. In FIG. 8, such software may be part of MAC layer software 884, or may be closely associated therewith. Of course, the transaction information processing logic of the present invention could reside in hardware, software, or some combination of the two.

According to a specific implementation, the procedures typically employed by the CMTS during registration and pre-registration may be performed at the MAC layer of the line card 800. In such an embodiment, most of the registration operations may be performed by the hardware and software provided for MAC layer logic 830.

The example of a CMTS that can be used with the present invention has been described above to emphasize routing engine redundancy. However, it will be appreciated by one of skill in the art that the CMTS may be configured in a variety of manners including configurations for providing line card redundancy. (FOR CISCP222 only).

It will be appreciated by one having ordinary skill in the art that the technique of the present invention may be implemented in any computer network having a standardized protocol for utilizing a central termination system (e.g. Head End) to schedule timeslots for remote stations or nodes on a return (or upstream) channel. In wireless networks, the central termination system may be referred to as a Head End or wireless base station. In satellite networks, the central termination system may be referred to as a master controlling station.

While the discussion to this point has focused on transaction information processing techniques for cable networks, the technology of the present invention may be applied to any access or shared-access network having a plurality of hosts or nodes which share at least one channel for communicating with at least one "Head End" in the network. Examples of shared-access networks include, in addition to cable networks, wireless networks, Ethernet, FastEthernet, GigabitEthernet, LANs, etc. In the cable network, the plurality of nodes represents a plurality of cable modems that communicate with at least one CMTS at the centralized termination system using at least one shared-access upstream and downstream channel.

In general, the methods and apparatus described above may be implemented on a traffic handling device (e.g., a switch or router) for providing transaction information processing capability in a network having at least one traffic handling device (e.g., another switch or router) that provides normal service to a host. In the wireless system (e.g., represented by FIG. 9) the plurality of nodes or hosts corresponds to the plurality of wireless nodes 950 which use at least one shared access channel to communicate with at least one access control system 922 located at the Head End of the wireless system.

Figure 9:
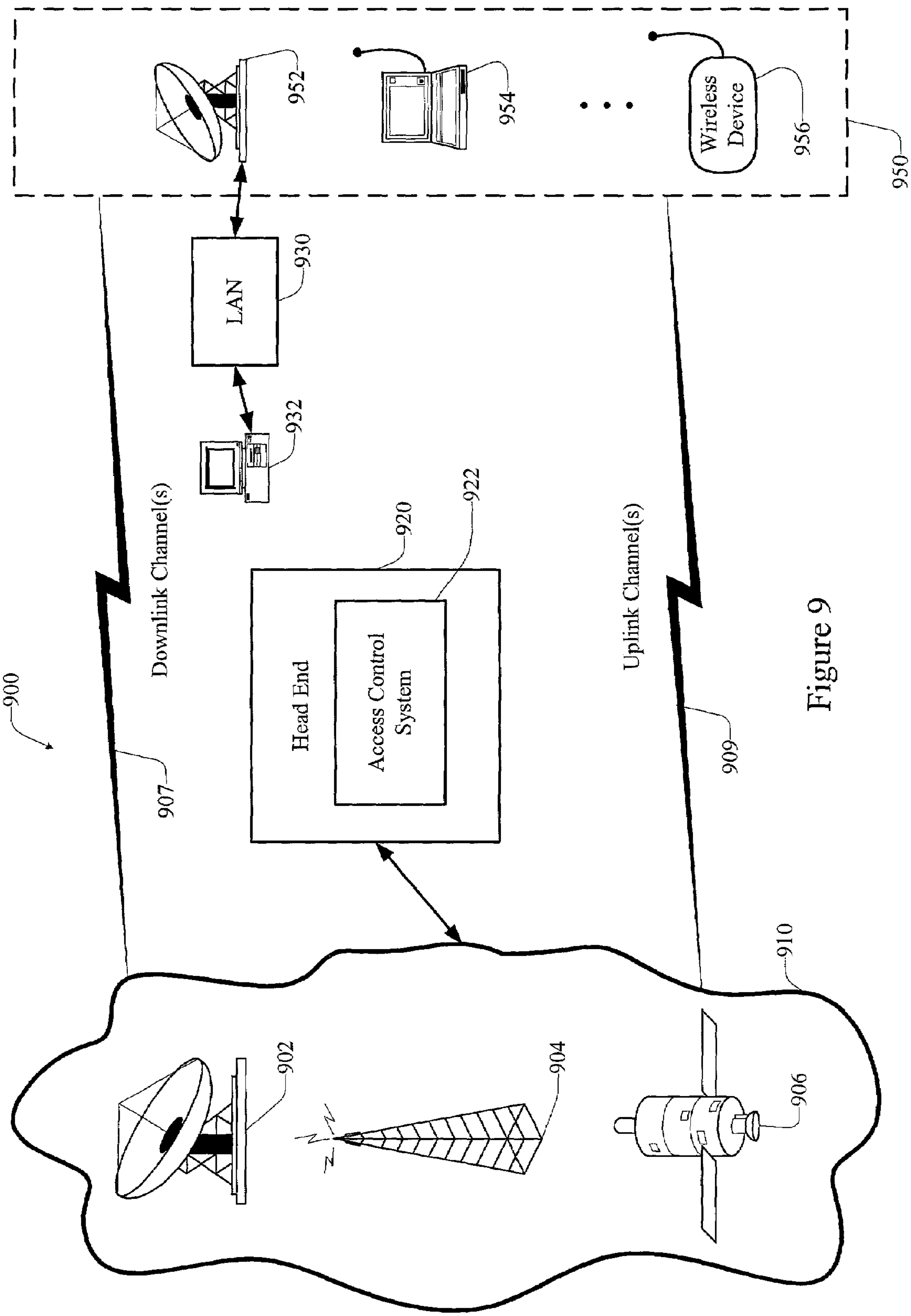
FIG. 9 is a diagrammatic representation of a wireless system that can be used to implement the techniques of the present invention.

FIG. 9 shows an example of a wireless data communication system 900 which may be used for implementing the technique of the present invention. As shown in FIG. 9, the wireless system includes a central termination system (or Head End) 920. The Head End includes an access controller or access control system (ACS) 922 which communicates with a plurality of wireless nodes 950, and coordinates access between each of the wireless nodes and the Head End 920. The access controller 922 may include memory and at least one processor. In a specific embodiment, the function of the access controller 922 is analogous to that of the CMTS described above with respect to cable modem networks. It may serve as a router or switch as well.

The Head End 920 communicates with a plurality of wireless nodes 950 via any one of a plurality of wireless transmitting and receiving devices 910. As shown in FIG. 9, for example, the plurality of wireless transmitting and receiving devices 910 may include satellite base stations 902, orbital satellites 906, radio towers 904, etc.

In a specific embodiment which is analogous to that of cable modem networks, the Head End 920 of the wireless computer system communicates with the plurality of nodes 950 via one or more downlink channels 907 and one or more uplink channels 909. Each downlink channel 907 is a broadcast-type channel utilized by the Head End to communicate with an associated group of wireless nodes within the wireless network. The uplink channel 909 is a shared-access channel, which is utilized by a group of wireless nodes (analogous to cable modems) to communicate with the Head End 920. The access controller 922 stores registration parameters for the various nodes that it services. It may also store the IP addresses for nodes that it services.

In a specific embodiment of the present invention, the registration process and information is similar to that of the cable network CMTSs described above. Moreover, the technique of the present invention for transaction information processing capability over a shared access data network may be implemented in wireless system 900. The wireless devices or nodes 950 may include any one of a number of wireless transmitting/receiving devices. For example, a satellite dish 952 may be used to communicate with the Head End 920 via the uplink and downlink channels. The satellite dish may, in turn, be connected to a local area network (LAN) 930 which, may be further connected to one or more computer systems 932. Another wireless device may be a portable/wireless computer system 954, which is able to transmit and receive information to the Head End via uplink and downlink channels 907 and 909. Other wireless devices 956 may include, for example, wireless telephones, handheld computing devices, etc.

In specific embodiments where the uplink and downlink channels within the wireless system 900 are utilized in a manner similar to that of the upstream and downstream channels of a cable modem network, the above-described transaction information processing techniques may easily be implemented in wireless system 900 using the detailed description of the present invention provided herein. Moreover, the technique of the present invention may be easily implemented in any computer network which uses shared access channels for communicating between a centralized computing system and one or more remote nodes.

It will be appreciated that the technique of the present invention is not limited to cable networks, and may be applied to any access data network which uses at least one shared access communication channel to communicate between a plurality of nodes in the network and a Head End of the network.

Although several preferred embodiments of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

What is claimed is:

1. A method for a working system to provide transaction information to a redundant system in a data network, the working system coupled to a plurality of nodes, the method comprising:

identifying a first transaction at the working system;

identifying a second transaction at the working system;

characterizing the first transaction and the second transaction using relationship information to generate condensed transaction information corresponding to the first transaction and the second transaction;

providing the condensed transaction information to the redundant system.

2. The method of claim 1, wherein the relationship information comprises a characteristic common to both the first transaction and the second transaction.

3. The method of claim 1, wherein the relationship information is user defined.

4. The method of claim 1, wherein the relationship information comprises session information.

5. The method of claim 1, wherein the relationship information comprises accounting server information.

6. The method of claim 1, wherein the relationship information comprises cable modem information.

7. The method of claim 1, wherein the working system is associated with a cable network headend.

8. The method of claim 1, further comprising maintaining a log storing the first transaction and the second transaction at the working system.

9. The method of claim 1, further comprising maintaining a log storing the condensed transaction information at the working system.

10. The method of claim 1, wherein the working system is coupled to a plurality of nodes on an access network.

11. The method of claim 10, wherein the access network is a cable network implemented in accordance with a DOCSIS standardized protocol, and wherein said nodes are cable modems.

12. A method for a working routing engine associated with a data network to process transaction information associated with a plurality of nodes, the method comprising:

identifying transaction information associated with a plurality of transactions;

condensing the transaction information using relationship information corresponding to the plurality of transactions to generate condensed transaction information; and providing the condensed transaction information to a redundant routing engine.

13. The method of claim 12, wherein the relationship information comprises a characteristic common to both the first transaction and the second transaction.

14. The method of claim 12, wherein the relationship information is user defined.

15. The method of claim 12, wherein the relationship information comprises session information.

16. The method of claim 12, wherein the relationship information comprises accounting server information.

17. The method of claim 12, wherein the relationship information comprises cable modem information.

18. The method of claim 12, wherein the working system is associated with a cable network headend.

19. The method of claim 12, further comprising maintaining a log storing the first transaction and the second transaction at the working system.

20. The method of claim 12, further comprising maintaining a log storing the condensed transaction information at the working system.

21. The method of claim 12, wherein the working system is coupled to a plurality of nodes on an access network.

22. The method of claim 21, wherein the access network is a cable network implemented in accordance with a DOCSIS standardized protocol, and wherein said nodes are cable modems.

23. A cable network headed coupled to a plurality of nodes in a data network, comprising:

a working system having a processor coupled to memory and an interface, the first processor configured to identify transaction information and condense the transaction information using relationship information, the interface coupled to the processor for transmitting the condensed transaction information;

a redundant system having a second processor coupled to second memory and a second interface, the second interface for receiving the condensed transaction information.

24. The cable network headend of claim 23, further comprising a plurality of line cards coupled to the working system.

25. The cable network headend of claim 23, further comprising a plurality of line cards coupled to the redundant system.

26. The cable network headend of claim 23, wherein the relationship information comprises a characteristic common to both the first transaction and the second transaction.

27. The cable network headend of claim 23, wherein the relationship information comprises session information.

28. The cable network headend of claim 23, wherein the relationship information comprises accounting server information.

29. The cable network headend of claim 23, wherein the relationship information comprises cable modem information.

30. The cable network headend of claim 23, wherein the working system is coupled to a plurality of nodes on an access network.

31. The cable network headend of claim 30, wherein the access network is a cable network implemented in accordance with a DOCSIS standardized protocol, and wherein said nodes are cable modems.

32. A working system coupled to a redundant system and a plurality of nodes in a data network, the working system comprising:

memory;

at least one processor coupled to memory, the at least one processor configured to identity transaction information associated with a plurality of transaction and to characterize the transaction information using relationship information to generate condensed transaction information;

an interface coupled to the processor, the interface configured to provide condensed transaction information to the redundant system.

33. The working system of claim 32, wherein the relationship information comprises a characteristic common to both the first transaction and the second transaction.

34. The working system of clam 32, wherein the relationship information comprises session information.

35. The working system of claim 32, wherein the relationship information comprises accounting server information.

36. The working system of claim 32, wherein the relationship information comprises cable modem information.

37. The working system of claim 32, wherein the working system is associated with a cable network headend.

38. The working system of claim 32, wherein the redundant system is associated with a cable network headend.

39. The working system of claim 32, further comprising maintaining a log storing the first transaction and the second transaction at the working system.

40. The working system of claim 32, further comprising maintaining a log storing the condensed transaction information at the working system.

41. The working system of claim 32, wherein the working system is coupled to a plurality of nodes on an access network.

42. The working system of claim 41, wherein the access network is a cable network implemented in accordance with a DOCSIS standardized protocol, and wherein said nodes are cable modems.

43. A computer readable medium for configuring a working system to provide transaction information to a redundant system, the working system coupled to a plurality of nodes in a data network, the computer readable medium comprising:

computer code for identifying a first transaction at the working system;

computer code for identifying a second transaction at the working system;

computer code for analyzing the first transaction and the second transaction using relationship information to generate condensed transaction information corresponding to the first transaction and the second transaction;

computer code for providing the condensed transaction information to the redundant system.

44. The computer readable medium of claim 43, wherein the relationship information comprises a characteristic common to both the first transaction and the second transaction.

45. The computer readable medium of claim 43, wherein the relationship information comprises session information.

46. The computer readable medium of claim 43, wherein the relationship information comprises accounting server information.

47. The computer readable medium of claim 43, wherein the relationship information comprises cable modem information.

48. A working routing engine associated with a cable network headend configured to condense transaction information associated with a plurality of nodes in a data network, the working routing engine comprising:

means for identifying transaction information associated with a plurality of transactions;

means for condensing the transaction information using relationship information corresponding to the plurality of transactions to generate condensed transaction information; and means for providing the condensed transaction information to a redundant routing engine.

49. The working routing engine of claim 48, further comprising providing the condensed transaction information to the redundant system.

50. The working routing engine of claim 48, wherein the relationship information comprises a characteristic common to both the first transaction and the second transaction.

51. The working routing engine of claim 48, wherein the relationship information comprises session information.

52. The working routing engine of claim 48, wherein the relationship information comprises accounting server information.

53. The working routing engine of claim 48, wherein the relationship information comprises cable modem information.

* * * * *